United States Patent [19]
Blain

[11] Patent Number: 6,032,187
[45] Date of Patent: *Feb. 29, 2000

[54] DATA SERVICE UNIT HAVING INBAND NETWORKING PROTOCOL PACKET PROCESSING CAPABILITIES

[75] Inventor: Robert A. Blain, Plantsville, Conn.

[73] Assignee: General DataComm, Inc., Middlebury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/658,842

[22] Filed: May 31, 1996

[51] Int. Cl.$^7$ .................................................. G06F 13/14
[52] U.S. Cl. ........................ 709/230; 709/250; 370/249; 370/465
[58] Field of Search ........................ 395/200.79, 200.66, 395/200.62; 379/29, 27, 5, 257, 111–116; 370/249, 392, 389, 420, 110.1; 384/238.3, 262.4; 709/230, 224, 237

[56] References Cited

U.S. PATENT DOCUMENTS

| | | | |
|---|---|---|---|
| 4,849,972 | 7/1989 | Hackett et al. | 370/110.1 |
| 5,285,450 | 2/1994 | Emerson | 370/99 |
| 5,327,433 | 7/1994 | Hall | 370/100.1 |
| 5,390,179 | 2/1995 | Killian et al. | 370/68 |
| 5,434,866 | 7/1995 | Emerson et al. | 370/99 |
| 5,495,516 | 2/1996 | Lee et al. | 379/29 |
| 5,553,124 | 9/1996 | Brinskele | 379/111 |
| 5,574,723 | 11/1996 | Killian et al. | 370/68.1 |
| 5,608,720 | 3/1997 | Biegel et al. | 370/249 |
| 5,659,684 | 8/1997 | Giovannoni et al. | 395/200.8 |
| 5,726,986 | 3/1998 | Emerson et al. | 370/384 |
| 5,784,558 | 7/1998 | Emerson et al. | 709/230 |

*Primary Examiner*—Mark H. Rinehart
*Assistant Examiner*—Ivan C. Pierce, III
*Attorney, Agent, or Firm*—David P. Gordon; David S. Jacobson; Thomas A. Gallagher

[57] ABSTRACT

An intelligent data service unit (DSU) which terminates a digital subscriber loop is provided and includes a digital subscriber loop interface which receives incoming data from a DDS line of the service provider, a framing and signal converter for taking the incoming data and formatting the data for output, an output interface, a processor connected to the framing and signal converter and to each of the interfaces, and a data memory buffer coupled to the processor. All data provided to the DSU from the digital subscriber loop is reformatted by the framing and signal converter and propagated to the output interface as it is received. At the same time, a copy of the data is buffered into the memory, and the processor scans the memory to find and synchronize with an networking protocol frame (e.g., an IP frame) Once synchronized, the processor compares the destination address in the IP frame to the network address of the DSU. If the addresses match, the IP frame is stored for processing (e.g., the DSU may be directed to gather statistical information and/or to configure the DSU according to protocol standards). If the addresses do not match, the frame is discarded by the processor. The DSU is preferably SNMP compatible and is provided with a management information base which allows the SNMP controller to configure, diagnose and maintain circuit integrity.

17 Claims, 5 Drawing Sheets

DATA SERVICE UNIT HAVING INBAND NETWORKING PROTOCOL PACKET PROCESSING CAPABILITIES

BACKGROUND OF THE INVENTION

1. Field of the Invention

The present invention relates broadly to telecommunication network systems. More particularly, the present invention relates to an intelligent data service unit (DSU) located in a managed telecommunications network.

2. State of the Art

Data service units (DSUs) are common elements in telecommunications networks today and basically serve as the termination point of a digital subscriber loop (e.g., a termination for a digital data service (DDS) line defined in ANSI T1.410). As seen in a typical prior art configuration of FIG. 1, the data service unit 12 sits between a service provider 14 and a router 16 and provides an interface (e.g., DDS or frame relay interface) between a four-wire metallic subscriber loop 17 of the service provider and the wide area network (WAN) interface 18 of the router. In other words, in one direction, the DSU 12 receives bipolar-return-to-zero data on a DDS line and converts it into WAN-compatible data; and in the other direction the DSU 12 receives WAN data and converts it for output onto the digital subscriber loop (i.e., the subscriber/service provider "line") The router is often coupled to one or more local area networks (LANs) 20, each typically having multiple user terminals 24. The function of the router is to take the data provided by the DSU (e.g., WAN formatted data) and convert it into high speed local area network (LAN) traffic (often using Ethernet or token ring protocol). Thus, the router establishes a dialog between itself and the service provider. This dialog is typically called a "session", and may be a session governed by a standard protocol (e.g., PPP or Frame Relay described in ANSI T1.618 and ITU-T Q922) or a proprietary protocol. In any case, a data link connection (e.g., PPP, HDLC, or Frame Relay) is established between the two nodes, allowing for network IP connections to occur between multiple LANs sharing the same service provider, one of which is used by the management station.

The customer equipment of FIG. 1 is managed by a network management station 30 coupled to the service provider (i.e., the "cloud") 14. The function of the network management station 30 is to determine what equipment is coupled to the network, to configure that equipment, to obtain alarm information and network statistical information, and to run diagnostic tests on the equipment in the network. In carrying out its functions, the network management station typically runs programs according to a protocol such as SNMP (simple network management protocol), or any other protocol such as TCP (transmission control protocol), ICMP (internet control message protocol) which runs atop the Internet Protocol (IP) packet environment.

It is well accepted in the art that DSUs are "dumb terminals"; i.e., they simply reformat all incoming data to an outgoing frame and signal format, and take no action based on the contents of the customer data; although some DSUs can respond to service provider test commands such as DSU/CSU loop backs and V.54/PN127 loop initiation sequences. Thus, in order to manage the DSU from a network management station, for configuration or diagnostic purposes, it is necessary to send an IP packet from the network management station 30 through the service provider 14, through the DSU 12, through the router 16, and to the LAN 20, and to provide the DSU with a terminal server (i.e., LAN to serial interface equipment—not shown) or a direct LAN interface port 32 so that it can receive the IP packet from the LAN in an out-of-band manner. While this arrangement, if provided, can be used to effectively configure the DSU and can be used to obtain diagnostic information, it suffers from various drawbacks. First, should the router or LAN fail, there is no manner of remotely managing the DSU, as management of the DSU is via the router and LAN. Thus, management of the DSU will be interrupted precisely when it might be most needed. Second, the hardware of the DSU must be changed for each type of LAN utilized, as the DSU must be provided with its own SLIP/PPP serial connection and port or MAC interface hardware and MAC address as well as its own LAN IP and gateway IP and MAC address. Third, it will be appreciated that this extra hardware adds a significant cost to the DSU.

SUMMARY OF THE INVENTION

It is therefore an object of the invention to provide a DSU which acts as a direct replacement for a traditional DSU, but which can be directly managed by a network management station.

It is another object of the invention to provide an intelligent DSU which can be managed by an off-site network management station without connecting the DSU to a LAN.

It is a further object of the invention to provide a network managed DSU which does not require a terminal server or dedicated connection for network management purposes.

It is an additional object of the invention to provide a network managed DSU which can interoperate automatically with "de facto" standard router equipment and adapt automatically to protocol changes which occur because of equipment and/or service upgrades.

Another object of the invention is to provide a DSU which utilizes existing network address assignments and/or circuit address assignments in a network managed system.

In accord with the objects of the invention which are discussed in more detail below, a DSU which terminates a digital subscriber loop is provided and includes a digital subscriber loop interface which receives incoming data on a DDS line from the service provider, a framing and signal conversion means for taking the incoming data and formatting the data for output, an output interface to a router, a processor coupled to the framing and signal conversion means and to each of the interfaces, and a data buffer (memory) coupled to the processor. The processor includes frame synchronization means for finding and synchronizing with an IP frame, frame address comparison means for comparing the destination address in the IP frame to the destination address of the DSU itself, and network management protocol control means for obtaining statistical information and/or configuring the DSU according to protocol standards.

With the provided hardware, all data provided to the DSU from the digital subscriber loop is reformatted by the framing and signal conversion means and propagated to the output interface as it is received. At the same time, a copy of the data is buffered into the memory. When a complete packet of data is received, the frame synchronization means scans the memory locations to determine if and where the IP data is being held. Upon finding the IP header, the offset location of the IP header (or the IP destination address) within the packet is stored for future reference, and the destination address in the IP frame is compared by the comparison means to determine whether the IP frame is intended for the DSU. When the IP frame is not intended for the DSU, the frame is discarded by the processor. However, when the IP frame is intended for the DSU, the headers and trailers of the entire packet are saved for future reference, and the IP frame is stored for processing by the network management protocol control means. Based on the protocol-based commands in the frame, the network management protocol control means performs its functions, and may then transmit data to the network manager. In particular, data would be transmitted to the network manager by generating an IP frame, adding the headers and trailers and other protocol information (e.g., HDLC flags), stopping transmission of user data, and transmitting the frame to the IP originating address (i.e., the network manager).

In accord with a preferred aspect of the invention, the DSU is SNMP compatible, with network management protocol control means complying with SNMP standards. Thus, the SNMP controller of the DSU is provided with a management information base (MIB) which allows the SNMP controller to configure, diagnose and maintain circuit integrity. In accord with another preferred aspect of the invention, the DSU is provided with a non-volatile writable memory in which the DSU IP address is stored during initialization of the DSU. In accord with yet another preferred aspect of the invention, the intelligent DSU of the invention is configured to provide a V.35, EIA/TIA-232, or EIA 530 interface to the terminating equipment (e.g., DTE or WAN), and a 56 Kbps or 64 Kbps DDS type interface to the loop.

Additional objects and advantages of the invention will become apparent to those skilled in the art upon reference to the detailed description taken in conjunction with the provided figures.

DETAILED DESCRIPTION OF THE PREFERRED EMBODIMENT

Figure 2:
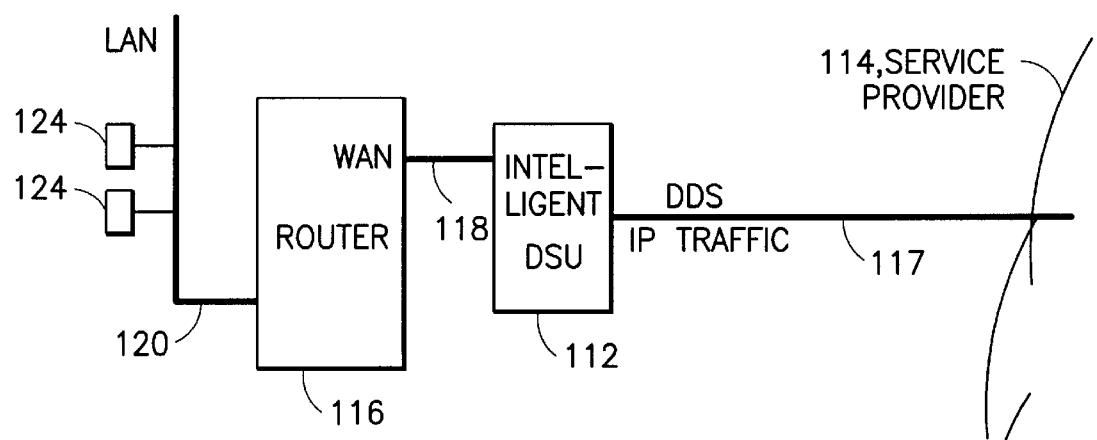
FIG. 2 is a diagram of the network managed telecommunications system of the invention utilizing an intelligent DSU.
Figure 2:
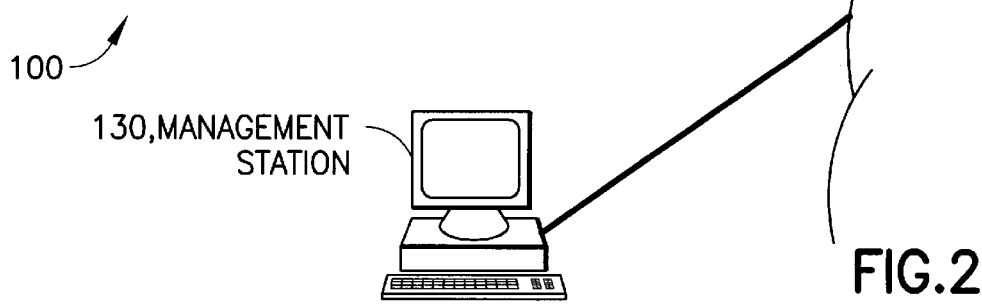

Turning to FIG. 2, a diagram is seen of the network managed telecommunications system 100 of the invention utilizing the intelligent DSU 112 of the invention. The intelligent DSU 112, which is commercially available under the trademark SNMP 540 IFP from the assignee hereof General DataComm, Inc., in conjunction with an Installation and Operation Manual Publication GDC 058R134-000 Issue 2, which is hereby incorporated by reference herein in its entirety) is shown located between a service provider 114 and a router 116, and provides an interface (e.g., DDS or Frame Relay interface) between a four-wire metallic subscriber loop 117 of the service provider 114 and the WAN interface 118 of the router 116. In other words, in one direction, the DSU 112 receives bipolar-return-to-zero data and converts it into WAN-compatible data; and in the other direction the DSU 112 receives WAN data and converts it for output onto the digital subscriber loop 117 (i.e., the DDS "line"). The router (which may be well-known equipment sold by, e.g., CISCO, Bay Networks, Inc., 3COM, etch) is often coupled to one or more local area networks (LANs) 120, each typically having multiple user terminals 124. The entire telecommunications system 100 is managed by a network management station 130 (such as a TEAM 540 sold by General DataComm, Inc.), which is coupled to the service provider (i.e., the "cloud") 114.

Figure 3:
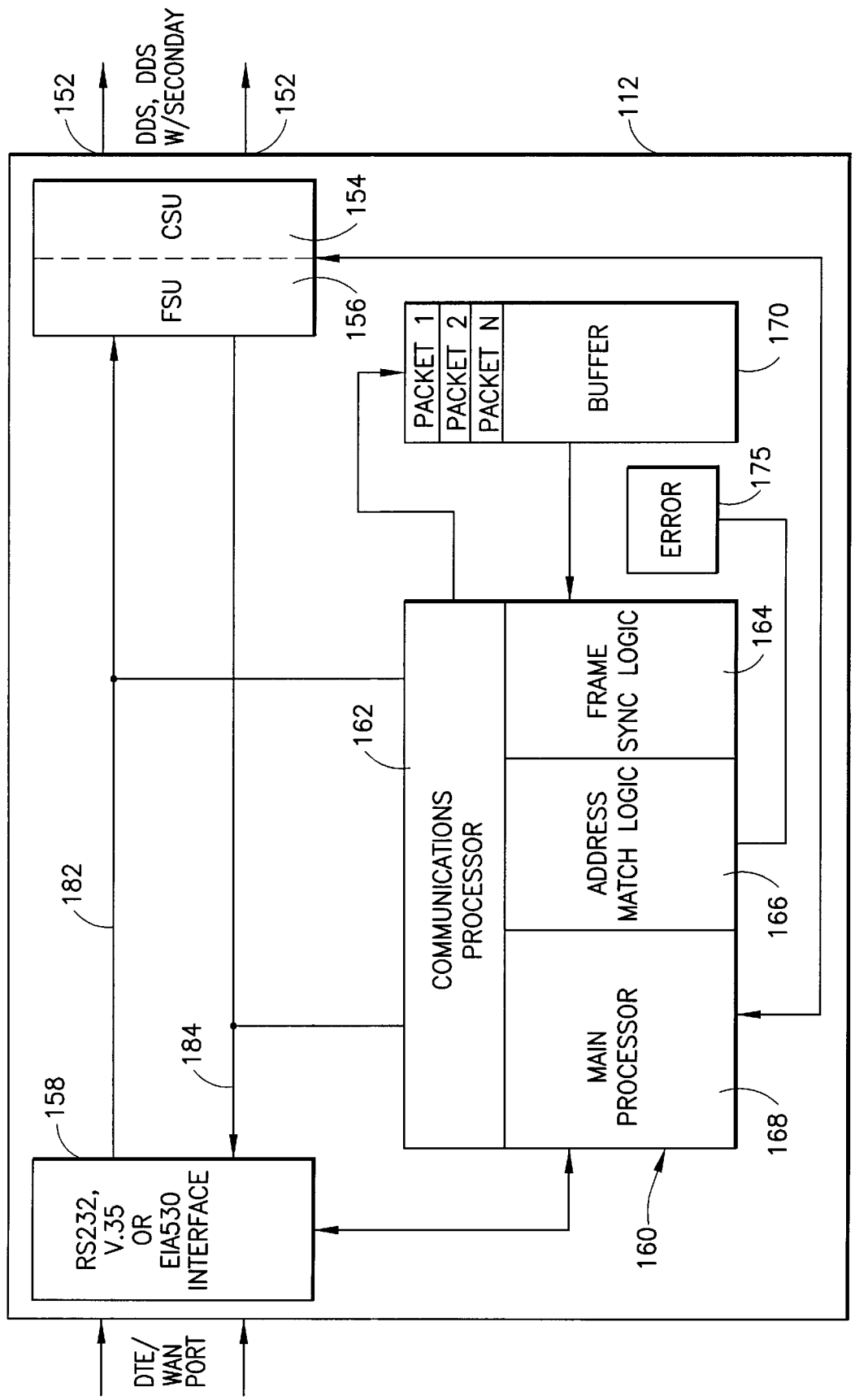
FIG. 3 is a high level block diagram of a preferred embodiment of the intelligent DSU of the invention used in FIG. 2.

A high level block diagram of a preferred embodiment of the intelligent DSU 112 of the invention is seen in FIG. 3. The intelligent DSU 112 includes a digital subscriber loop port 152, a channel service unit (CSU) 154, a framing conversion unit (FCU) 156, a RS232, V.35 or EIA 530 interface 158, a microprocessor 160 (e.g., a 68302 Motorola microprocessor), a data buffer RAM or memory 170 (e.g., 128K×8 RAM), and a writable non-volatile memory 175 (e.g., a flash and serial EEPROM). The DDS port 152 receives incoming data from the service provider and provides the data to the channel service unit (CSU) 154 which acts to converts the incoming bipolar-return-to-zero sine wave signal into a square wave signal of the appropriate magnitude, polarity, etc. (as is well known in the art). The framing conversion unit 156 then reframes and retimes the square wave signal and derives a clock (all of which are accomplished in a manner well known in the art) into a suitable signal for a WAN or a DTE, or whatever is coupled to the RS232, V.35 or EIA530 output interface 158. It is noted that the CSU and FSU are often an integral LSI unit, and in conjunction with the input port and the output interface constitute the elements of well-known prior art DSUs.

According to the invention, copies of all data received and reformatted by the CSU and FSU are also provided to the microprocessor 160. For purposes of functionality, the microprocessor 160 is shown to include a communications processor portion 162, a frame synch logic portion 164, an address match logic portion 166, and a main SNMP TCP/IP processor portion 168; although in implementation, one or more (micro)processors may be utilized to accomplish all of those functions. As shown in FIG. 3, the communications processor portion 162 copies all data provided on the service-provider-to-terminal bus 182 coupling the FSU and the output interface, and forwards the data to the buffer memory 170. Once in the buffer memory, the frame synchronization logic portion 164 of the microprocessor finds the HDLC frame (shown in FIG. 6, and defined in, for example, RFC 1549 of the Network Working Group, W. Simpson, Editor, December 1993 which is hereby incorporated by reference herein in its entirety), and looks in the information portion of that frame for an IP packet (shown in FIG. 7, and defined in, for example, RFC 791, Internet Protocol, DARPA Internet Program Protocol Specification, September 1981, prepared for DARPA by Information Sciences Institute, University of Southern California, which is hereby incorporated by reference herein in its entirety). As discussed in more detail below with reference to FIG. 4, once the "Version" bits of the IP packet (see FIG. 7) are located (as confirmed by an appropriate Header Checksum of the IP packet), the offset of the location of the IP frame in the information portion of the HDLC frame is found and stored by the frame sync logic 164 so that it can be reused for later frames which are received. As a result, once frame synchronization is achieved, due to the stored offset, no additional framing is required to locate the IP frame. Upon finding the IP frame, the address match logic 166 is used to compare the IP address of the DSU stored in the non-volatile memory 175 to the destination address of the IP frame. If the address contained in the destination address bytes of the incoming IP frame does not match the IP address of the DSU, the entire HDLC frame is discarded from the buffer memory (i.e., it may be overwritten with incoming data). However, if the addresses do match, then the HDLC header and trailer (if any), and the IP frame are all preferably stored in memory associated with the main SNMP TCP/IP processor portion 168. The main SNMP TCP/IP processor portion 168 then reads and processes the IP frame in a manner well known in the SNMP arts. If a response to the incoming IP packet is required, (e.g., if the network management station 130 requires statistics) the main SNMP processor portion 168 creates an SNMP/IP packet in a manner well known in the art. The SNMP/IP packet is wrapped in headers and possibly trailers in one of two preferred manners. First, for unknown protocols which utilize non-standard address and control fields which could possibly vary in length, the header elements are retrieved from memory and pre-pended to the SNMP/IP packet. Second, for known protocols (e.g., Frame Relay, PPP, etc.), the appropriate headers are generated and added to the frame. In SMDS DXI 3.2, the appropriate trailers are likewise generated and added. Regardless, the IP packet is then forwarded to the communications processor portion 162 which conducts low-level framing, thereby creating the HDLC packet (e.g., by adding the starting and ending flags and CRC), and places the packet on the terminal-to-service-provider bus 184. The HDLC packet is then formatted by the framing and signal conversion units 156, 154 for output on the DDS line.

It is noted that the intelligent DSU of the invention is preferably provided with the IP address which would have been assigned to a prior art type DSU; i.e., a LAN or terminal port address. In this manner, the inband managed DSUs mimic the addressing scenario of out-of-band managed DSUs which they will often be replacing.

Figure 4:
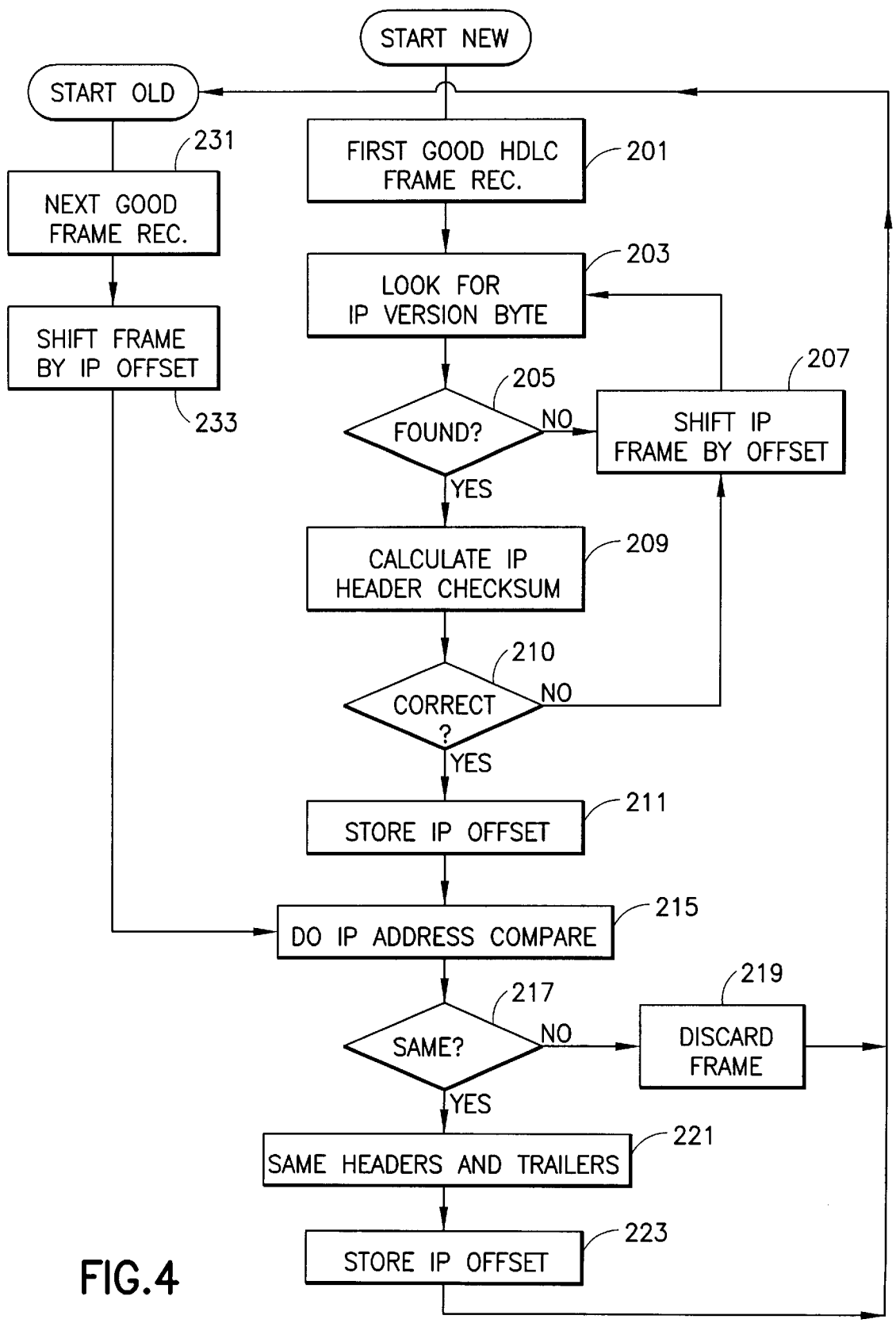
FIG. 4 is a flow diagram of the frame synchronization and address matching logic of the processor of FIG. 3.
Figure 6:
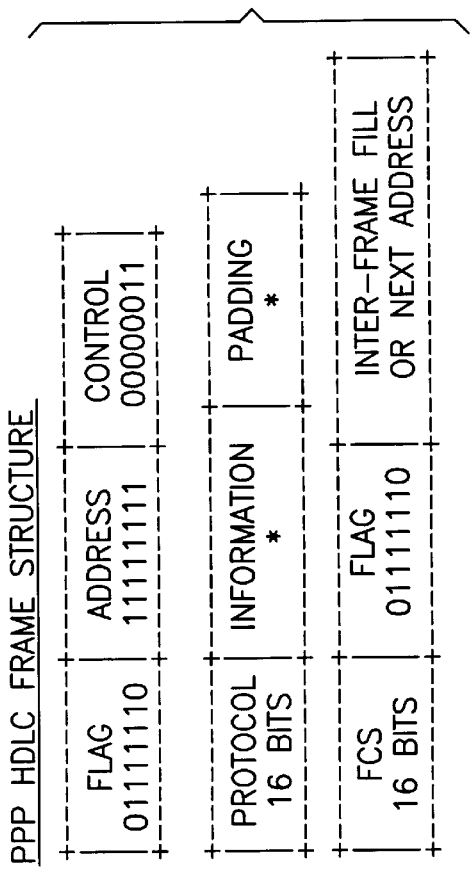
FIG. 6 is a diagram of the frame structure of a HDLC packet.
Figure 7:
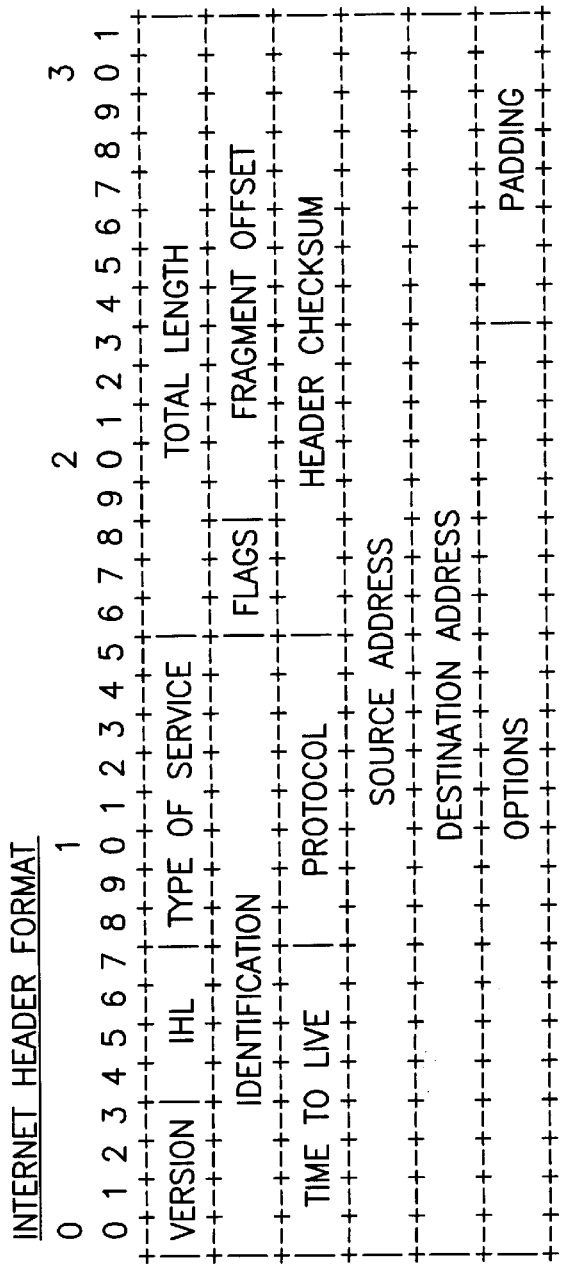
FIG. 7 is a diagram of the header structure of a IP packet encapsulated in the HDLC packet of FIG. 6.

Turning to FIG. 4, and with reference to FIGS. 3, 6 and 7, a high level flow chart of the software of the microprocessor 160 shown in FIG. 3 is seen. At the outset, it should be appreciated that while not shown, as the microprocessor 160 is running this software, it is also coordinating the placement of a copy of all data being sent over bus 182 into the buffer memory 170. Thus, at 201, the microprocessor 160 synchronizes with the HDLC frame (FIG. 6). Upon the receipt and buffering of an HDLC frame in memory, the microprocessor at 203 searches for the IP Version nibble or byte of an IP packet (FIG. 7) within the information section of the HDLC frame on a byte-by-byte basis. If, at 205, the Version nibble or byte is not found at the first byte location of the HDLC frame immediately following the FLAG field, at 207, an IP offset counter of the microprocessor is increased, and a determination is made at 205 as to whether a second byte location includes the Version nibble or byte. This process continues, until the Version nibble or byte is believed to be found. Then, at 209, the IP Header Checksum (the eleventh and twelfth bytes of the IP header) is checked to confirm that the IP Version nibble or byte was properly located. If the value of the Header Checksum is not correct at 210, the program continues at step 207. However, if the value in the Header Checksum is correct, at 211, the IP offset counted by the offset counter of the microprocessor is stored for future reference.

Upon having properly located the IP packet, at 215, the destination address contained in the IP header (bytes thirteen through sixteen) is compared to the IP address of the DSU. If the addresses are not the same at 217, the IP packet is not intended for the DSU, and the entire HDLC frame is discarded at 219. However, if the addresses are the same at 217, the headers (e.g., the address, control, protocol, etc.) and trailers (if any) of the HDLC frame are saved at 221, and the IP frame is stored at 223 for processing. The program then continues by analyzing the next HDLC frame of data. In particular, if another frame of data is available at 231, the IP offset value as previously determined at 211 is used at 233 to locate the IP frame (and hence the IP destination address). The program then continues at 215, where the destination address contained in the IP header is compared to the IP address of the DSU. If the addresses are not the same at 217, the IP packet is not intended for the DSU, and the entire HDLC frame is discarded at 219. However, if the addresses are the same at 217, the headers and trailers of the HDLC frame are saved at 221, and the IP frame is stored at 223 for processing. The program then continues by analyzing the next HDLC frame of data, etc.

Figure 5:
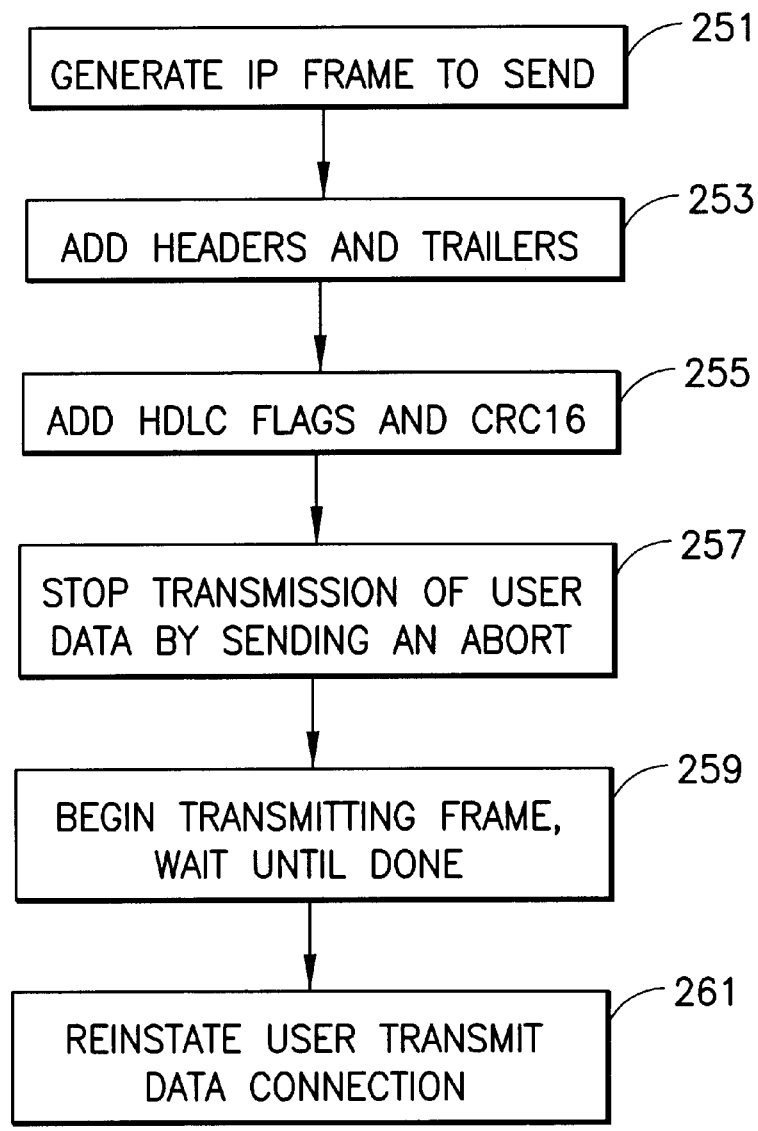
FIG. 5 is a flow diagram of the transmit processing of the processor of FIG. 3.

Turning to FIG. 5, a flow chart is seen of the transmit processing of the microprocessor. At 251 an IP frame is generated by the microprocessor utilizing a management information base (MIB) which allows the microprocessor to configure the DSU (see the connections between the SNMP portion of the microprocessor with the DSU interfaces in FIG. 3), diagnose errors, and maintain circuit integrity. The IP frame is typically responsive to a particular message previously forwarded by the network management station. Then, at 253, the headers and trailers saved at 221 relating to the message to which the now-generated message is responding are added to the IP frame. At 255, HDLC flags, a checksum (CRC), and additional HDLC information are added to the IP frame to generate a HDLC frame. The transmission of user data (if any) is then stopped at 257 by sending an HDLC ABORT signal, as is well known in the art, and the connection from the DTE/WAN port to the service provider is broken. The HDLC frame is then transmitted at 259, and at 261, after the end of the transmission the user transmit data connection is reinstated.

The HDLC frame structure on which the microprocessor of the intelligent DSU of the invention searches is seen in FIG. 6. The particular HDLC frame structure shown in FIG. 6 is a PPP (point-to-point protocol) HDLC frame structure, although other HDLC frames are known. All HDLC frames include start and stop flags of the same format (01111110), and an information field. Thus, regardless of the type of HDLC frame which is being received, the microprocessor can find the start flag and can search the entire frame for the start of the IP packet.

The header format for the IP packet is seen in FIG. 7 to include "Version" bits as the first four bits of a four-byte word. The header checksum which is located in the third and fourth bytes of the third four-byte word is used to verify that the bits believed to be the Version bits (which are set to 0100 for IP Version 4) do indeed start the IP frame; because if the wrong bits are identified as the Version bits, the value in the header checksum will not properly check out. It is noted that the destination address which is compared against the IP address of the intelligent DSU is the fifth four-byte word of the IP header.

Figure 1:
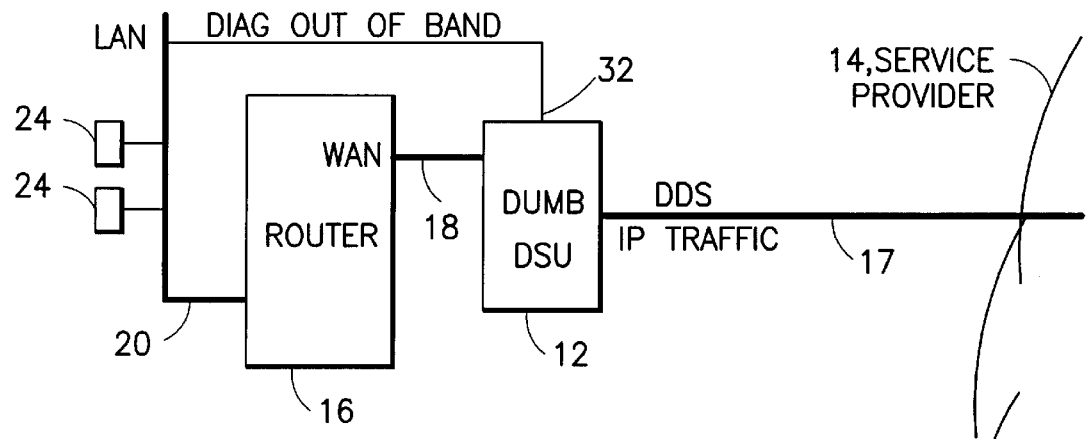
FIG. 1 is a diagram of a prior art network managed telecommunications system.

There have been described and illustrated herein an intelligent DSU having inband networking protocol packet processing capabilities. While particular embodiments of the invention have been described, it is not intended that the invention be limited thereto, as it is intended that the invention be as broad in scope as the art will allow and that the specification be read likewise. Thus, while particular high level interface and microprocessor circuitry for the intelligent DSU was shown, it will be appreciated that other interface and microprocessor circuitry could be utilized. For example, rather than a single microprocessor, multiple microprocessors could be utilized. Likewise, while a particular high level software flowchart was shown, it will be appreciated that other software could be utilized. For example, rather than storing an offset between the beginning of the HDLC frame and the IP frame (i.e., the number of bytes between the HDLC start flag and the IP Version bits), the offset between the HDLC start flag and the IP destination address may be stored. Further, while the invention was described with reference to the use of the Internet Protocol (IP) networking protocol, it will be appreciated that other networking protocols such as IPX, APPLETALK, DECNET could be utilized provided the DSU is programmed accordingly. Likewise, while the invention was described with reference to the use of the SNMP protocol for network management running on IP, it will be appreciated that other network management protocols could be utilized provided that the DSU is programmed accordingly. Similarly, while the invention was described with reference to a HDLC format, data can also be formatted for SMDS or Frame Relay as long as the network management protocol control means of the DSU is properly programmed. In addition, it should be appreciated that while the invention was described as accommodating only inband diagnostics, if desired, the DSU can be additionally provided with an appropriate port and terminal server for coupling to a LAN as shown in prior art FIG. 1. It will therefore be appreciated by those skilled in the art that yet other modifications could be made to the provided invention without deviating from its spirit and scope as so claimed.

I claim:

1. A data service unit which terminates a DDS line of a service provider which is carrying incoming data for a plurality of user terminals coupled to a router, comprising:

a) a digital subscriber loop interface which receives incoming data from the DDS line of the service provider said incoming data consisting essentially of data intended for the user terminals, b) a framing and signal conversion means coupled to said digital subscriber loop interface for taking the incoming data in bipolar-return-to-zero format and for reformatting and retiming the incoming data in square wave signal format for direct output from said data service unit;

c) a WAN output interface coupled to said framing and signal conversion means and coupled to the router, said WAN output interface receiving said reformatted and retimed data from said framing and signal conversion means and outputting WAN data to the router;

d) memory means for storing a copy of the reformatted and retimed incoming data;

e) processor means coupled to said framing and signal conversion means and to said memory means, said processor means for directing said copy of the reformatted and retimed incoming data to said memory means, for finding a networking protocol address in said copy of reformatted and retimed incoming data stored in said memory means, for comparing said networking protocol address with a network address of said data service unit, and for processing said copy of said reformatted and retimed incoming data according to a network management protocol when said network address corresponds to said networking protocol address of said data service unit.

2. A data service unit according to claim 1, wherein:
    said networking protocol is the Internet Protocol (IP), and said network address is an IP address.

3. A data service unit according to claim 1, further comprising:
    f) non-volatile memory means for storing said network address of said data service unit.

4. A data service unit according to claim 1, wherein:
    said processor means includes means for generating a networking protocol packet according to said network management protocol, and for providing said networking protocol packet to said framing and signal conversion means for output to said service provider over said digital subscriber loop interface.

5. A data service unit according to claim 4, wherein:
    said processor means for storing a header of an incoming frame when said networking protocol address corresponds to said network address of said data service unit.

6. A data service unit according to claim 5, wherein:
    said processor means includes means for generating a networking protocol packet according to said network management protocol with said networking protocol packet including said header, and for providing said networking protocol packet to said framing and signal conversion means for output to said service provider over said digital subscriber loop interface.

7. A data service unit according to claim 2, wherein:
    said incoming data is in an HDLC format, and said processor means finds said IP address in said incoming data by finding a start flag of an HDLC frame, and by finding a byte offset related to a location of said start flag in said HDLC frame and a location of said IP address in an information field of said HDLC frame.

8. A data service unit according to claim 7, wherein:
    said byte offset is an offset between said location of said start flag in said HDLC frame, and a location of Version bits in a header of an IP frame in said information field of said HDLC frame.

9. A data service unit according to claim 1, wherein:
    said processor means for discarding said incoming data when said incoming networking protocol address does not correspond to said network address of said data service unit.

10. A data service unit according to claim 2, wherein:
    said network management protocol is SNMP.

11. A data service unit according to claim 2, wherein:
    said processor means includes an SNMP management information base (MIB).

12. A data service unit according to claim 1 which is coupled to a router having a WAN interface and a LAN interface to which a LAN is coupled, wherein:
    said WAN output interface of said data service unit is coupled to the WAN interface of the router, and
    said network address of said data service unit is a LAN terminal address of the LAN.

13. A data service unit according to claim 1, wherein:
    said WAN output interface is one of an RS232, V.35 or EIA 530 output interface.

14. A data service unit which terminates a DDS line of a service provider which is carrying incoming data for a plurality of user terminals coupled to a router, comprising:

a) a digital subscriber loop interface which receives incoming data from the DDS line of the service provider said incoming data consisting essentially of data intended for the user terminals, b) a framing and signal conversion means coupled to said digital subscriber loop interface for taking the incoming data in bipolar-return-to-zero format and for reformatting and retiming the incoming data in square wave signal format for direct output from said data service unit;

c) a WAN output interface coupled to said framing and signal conversion means and coupled to the router, said WAN output interface receiving said reformatted and retimed data from said framing and signal conversion means and outputting WAN data to the router;

d) memory means for storing a copy of the reformatted and retimed incoming data;

e) non-volatile memory means for storing a network address of said digital service unit; and f) processor means coupled to said framing and signal conversion means and to said memory means, said processor means for directing said copy of the reformatted and retimed incoming data to said memory means, for finding an Internet Protocol (IP) address in said copy of reformatted and retimed incoming data stored in said memory means, for comparing said IP address with said network address of said data service unit, for processing said copy of said reformatted and retimed incoming data according to a network management protocol when said network address corresponds to said networking protocol address of said data service unit, and for discarding said reformatted and retimed incoming data when said incoming IP address does not correspond to said network address of said data service unit.

15. A data service unit according to claim 14, wherein:

said network management protocol is SNMP, said processor means includes an SNMP management information base (MIB), and said processor means further includes means for generating an SNMP IP packet, and for providing said SNMP IP packet to said framing and signal conversion means for output to said service provider over said digital subscriber loop interface.

16. A data service unit according to claim 15, wherein:

said incoming data is in an HDLC format, said processor means includes means for storing a header of an HDLC frame when said IP address corresponds to said IP address of said data service unit, and said processor means further includes means for generating an SNMP IP packet with said SNMP IP packet including said header, and for providing said IP packet to said framing and signal conversion means for output to said service provider over said digital subscriber loop interface.

17. A data service unit according to claim 14, wherein:

said incoming data is in an HDLC format, and said processor means finds said IP address in said incoming data by finding a start flag of an HDLC frame, and by finding a byte offset related to a location of said start flag in said HDLC frame and a location of said IP address in an information field of said HDLC frame.

* * * * *